United States Patent [19]

Hattori et al.

[11] Patent Number: 4,720,425
[45] Date of Patent: Jan. 19, 1988

[54] MULTI-LAYER LAMINATED STRUCTURE

[75] Inventors: Masafumi Hattori; Takayuki Inoue, both of Mie, Japan

[73] Assignee: Mitsubishi Petrochemical Co., Ltd., Tokyo, Japan

[21] Appl. No.: 936,774

[22] Filed: Dec. 2, 1986

[30] Foreign Application Priority Data

Dec. 18, 1985 [JP] Japan .................................. 60-285152

[51] Int. Cl.$^4$ ........................ B32B 27/36; B65D 35/08
[52] U.S. Cl. .................................... 428/340; 428/412; 428/483; 428/516; 428/518; 428/35
[58] Field of Search ......................... 428/412, 483, 340

[56] References Cited

U.S. PATENT DOCUMENTS 4,058,647  11/1977  Inoue et al. .......................... 428/474

FOREIGN PATENT DOCUMENTS

0186894A2  9/1986  European Pat. Off. ............ 428/412
52-032078A  3/1977  Japan .
52-125588A  10/1977  Japan .

OTHER PUBLICATIONS

Kirk–Othmer, Encyclopedia of Chemical Technology, 34d Ed, vol. 16, (1981), p. 437.

Primary Examiner—P. C. Ives
Attorney, Agent, or Firm—Oblon, Fisher, Spivak, McClelland & Maier

[57] ABSTRACT

A multi-layer laminated structure comprising a polycarbonate or thermoplastic polyester layer having adjacently adhered thereto a layer comprised of a modified olefin polymer having a stiffness modulus of from 100 to 3,000 Kg/cm$^2$ and a degree of crystallinity of not more than 33%, in which an unsaturated carboxylic acid or the derivative thereof is grafted to at least a part of a polymer consisting of a hydrocarbon. The laminated structure is excellent in moisture impermeability, oxygen barrier property, adhesion durability under a high temperature and high humidity condition, moldability, processability, and the like, and is useful as a packaging material.

9 Claims, No Drawings

MULTI-LAYER LAMINATED STRUCTURE

FIELD OF THE INVENTION

This invention relates to a multi-layer laminated structure excellent in moisture impermeability, oxygen barrier property, adhesion durability under high temperature and high humidity conditions, moldability, processability, and the like and suitable as packaging material. More particularly, it relates to a multi-layer laminated structure comprising a polycarbonate (hereinafter abbreviated as PC) or a thermoplastic polyester (hereinafter abbreviated as PES) and a specific modified olefin polymer which is excellent in adhesion to PC or PES and adhesion durability under high temperature and high humidity conditions.

BACKGROUND OF THE INVENTION

PC and PES exhibit excellent characteristics in transparency, heat resistance, mechanical strength, and the like, but are not always satisfactory in terms of moisture impermeability and oxygen barrier property for practical use.

In order to overcome these disadvantages while retaining the advantages inherent to these resinous polymers, it has been proposed to laminate a PC or PES layer with a resinous polymer having counterbalancing characteristics, such as polyolefins excellent in moisture impermeability or a saponified ethylene-vinyl acetate copolymer (EVA) excellent in oxygen barrier property. In particular, these attempts have been studied intensively in the fields of co-extrusion molding and co-injection molding that are suited for efficient production of laminated structures, and, in addition, orientation subsequent to the molding.

For example, polyolefins graft-modified with unsaturated carboxylic acids or the derivatives thereof have been proved adhesive to PC or PES as disclosed in Japanese Laid-Open Patent Application Nos. 125588/77 and 32078/77. However, as shown in working examples of the respective publication, the initial adhesion strength of these modified polyolefins is as low as from 150 to 200 g/cm for PC and from 200 to 270 g/cm for PES. Moreover, these laminated structure undergo drastic reduction in adhesion strength under a high temperature and high humidity condition as in retort processing as demonstrated in comparative examples hereinafter given.

That is, in lamination of PC or PES with a polyolefin or a saponified EVA by co-extrusion or co-injection molding, there has been found no high performance adhesive which achieves strong adhesion between these resinous polymers and is also excellent in heat endurance, and therefore laminated structures applicable to a broad field have not been provided.

SUMMARY OF THE INVENTION

The inventors have extensively investigated to solve the above-described problems associated with the conventional techniques, i.e., low initial adhesion strength and insufficient duration of adhesive strength. As a result, it has now been found that a modified olefin polymer having specific physical properties brings about a satisfactory solution.

The present invention provides a multi-layer laminated structure comprising a PC or PES layer having adjacently adhered thereto a layer comprised of a modified olefin polymer having a stiffness modulus of from 100 to 3,000 Kg/cm$^2$ and a degree of crystallinity of not more than 33%, in which an unsaturated carboxylic acid or the derivative thereof is grafted to at least a part of a polymer consisting of a hydrocarbon.

DETAILED DESCRIPTION OF THE INVENTION

The PC which can be used in the present invention is a polymer obtained by reacting a dihydroxy compound with phosgene or diphenyl carbonate in a known manner. In particular, a PC obtained by using 4,4'-dihydroxy-diphenyl-2,2-propane (bisphenol A) as a dihydroxy compound is preferred because of its excellent mechanical properties and transparency.

The PES which can be used in the present invention includes polymers obtained by direct polymerization of diols and dicarboxylic acids, and polymers obtained by ester exchange reaction between diols and dicarboxylic acid esters. Of these, a PES comprising 1,2-ethanediol or 1,4-butanediol as a main diol component and terephthalic acid as a main dicarboxylic acid unit is preferred because of its excellent heat resistance and mechanical strength. The PC and PES to be used in this invention can be selected appropriately from commercially available products. The PC and PES may contain various additives, such as stabilizers, colorants, fillers, nucleating agents, softening agents, and the like as long as they do not impair the effects of the present invention.

The modified olefin polymer which can be used in the present invention is those having a stiffness modulus ranging from 100 to 3,000 Kg/cm$^2$ and a degree of crystallinity of not more than 33%, in which an unsaturated carboxylic acid or the derivative thereof is grafted to at least a part of a polymer consisting of a hydrocarbon.

The term "polymer consisting of a hydrocarbon" as used herein covers not only a homopolymer or copolymer but also a polymer blend thereof irrespective of whether the polymer is resinous or elastomeric as long as it consists of a hydrocarbon.

Preferred examples of such polymers include homopolymers of α-olefins, such as ethylene, propylene, 1-butene, 1-pentene, 3-methyl-1-butene, 1-hexene, 4-methyl-1-pentene, etc., copolymers of two or more of these α-olefins, and mixtures thereof.

Since it is often delicate and intricate to control polymerization conditions to obtain a homopolymer of copolymer composing the modified homopolymer or copolymer which meets the above-described requirements of stiffness modulus and degree of crystallinity, it is more practical and preferred to achieve these requirements by blending, for example, high temperature-melting and high-crystalline olefin resinous polymers, such as polypropylene, high-density polyethylene, low-density linear polyethylene, poly-4-methyl-1-pentene, etc., and low-crystalline and low-stiffness modulus olefin rubbers, such as an ethylene-propylene copolymer rubber, an ethylene-propylene-diene copolymer rubber, an ethylene-1-butene copolymer rubber, etc.

The unsaturated carboxylic acid or the derivative thereof to be grafted to the above-described polymer consisting of the hydrocarbon includes acrylic acid, methacrylic acid, maleic acid, fumaric acid, itaconic acid, etc., and anhydrides, esters, amides, imides, metal salts, etc. of these acids. The most preferred among them is maleic anhydride.

Grafting of these unsaturated carboxylic acid (derivative) monomers to the polymer consisting of the hydrocarbon can be carried out by known processes, for example, by heating the polymer and the monomer in the presence or absence of a solvent with or without an aid of a radical polymerization initiator at a high temperature.

The graft-polymerization is preferably conducted so as to have a final graft monomer content of from 0.01 to 5% by weight. In the production on an industrial scale, such a graft monomer content can be achieved properly by previously preparing the polymer consisting of the hydrocarbon to which the graft monomer is grafted in a high concentration of from 0.5 to 10% by weight and then diluting thus obtained grafted polymer with an unmodified olefin polymer. The "unmodified olefin polymer" includes the same structure as the "polymer consisting of a hydrocarbon". It is also possible to use a modified olefin polymer prepared directly. If the graft monomer content in the modified olefin polymer is too small, the adhesion effect to PC or PES is insufficient for practical use.

If the stiffness modulus of the modified olefin polymer is less than 100 kg/cm$^2$, the adhesive strength attained is so low that the resulting laminated structure undergoes serious reduction in adhesive strength when subjected to retort processing. A stiffness modulus exceeding 3,000 Kg/cm$^2$ brings about little effect on improvement of adhesion strength. A preferred range of the stiffness modulus is from 100 to 2,000 Kg/cm$^2$. The stiffness modulus can be determined in accordance with ASTM-D790.

If the degree of crystallinity of the modified olefin polymer exceeds 33%, the adhesive strength level reached is too low to be used practically. A preferred degree of crystallinity is not more than 25%.

In the present invention, the degree of crystallinity of the modified olefin polymer can be determined according to the following density method. Densities of the polymers are measured according to JIS-K7112, and the preliminary treatment of samples is carried out in accordance with JIS-K6760 with respect to ethylene-based polymers and JIS-K6758 with respect to propylene-based polymers. A degree of crystallinity can be calculated from equation:

$$Xw = 100 \times d - d_a/d_c - d_a \times d_c/d$$

wherein d represents a density of a polymer used; $d_a$ represents a density of a perfect amorphous phase; and $d_c$ represents a density of a perfect crystalline phase. In these definitions, $d_a$ and $d_c$ values are set at, for example, 0.850 and 1.014, respectively, with respect to polyethylene, and 0.850 and 0.936, respectively, with respect to polypropylene.

In case of using copolymers, $d_a$ and $d_c$ values for a homopolymer comprising a monomer ($\alpha$-olefin) which occupies the major proportion of the copolymer are selected.

In case of using a blend of at least two polymers as a modified olefin polymer, its degree of crystallinity can be represented by the following equation as a blend system comprising n kinds of polymers:

$$Xw = \sum_{k=1}^{n} (\text{crystallinity of polymer } k) \times$$
(weight fraction of polymer $k$)

The above-described modified olefin polymer, particularly a rubbery component thereof, can be partly crosslinked in a known manner using organic peroxides, and the like. Such partial crosslinking is very effective to prevent packaging containers made of the resulting multilayered structure from reduction in adhesive strength and deterioration of appearance when subjected to retort processing. The crosslinking is preferably performed to such an extent that the residue on extraction with cyclohexane at room temperature for 48 hours falls within a range of from 40 to 80% by weight.

The multi-layer laminated structures according to the present invention can be produced by known co-extrusion or co-injection molding method.

The layer structure and layer thickness of the multilayered structure according to the present invention are not particularly restricted, and can be selected widely depending on marketing needs. For example, layer structures which are effective for use in packaging containers are shown below, in which A is a modified olefin polymer; B is PC; C is PES; D is an olefin polymer; and E is saponified EVA:

(1) A/B
(2) A/C
(3) D/A/B
(4) D/A/C
(5) D/A/B/A/D
(6) D/A/C/A/D
(7) D/A/C/A/E/A/D
(8) B/A/E/A/D
(9) B/A/E/A/B
(10) C/A/E/A/D
(11) C/A/E/A/C

Of these layer structures, those of (8) to (11) are particularly preferred for counterbalancing the disadvantages of PC or PES while retaining characteristics of these resinous polymers.

If desired, the laminated structures of the present invention may further contain an additional laminate made of resinous polymers other than those described above, such as polystyrene, polyvinyl chloride, etc., with an aid of other adhesives.

As described above, the laminated structures in accordance with the present invention have improved initial adhesion strength and adhesion durability under high temperature and high humidity conditions while maintaining advantageous characteristics of PC or PES and are, therefore, useful as packaging materials, such as containers for retort foods.

This invention will now be illustrated in greater detail with reference to the following examples and comparative examples, but it should be understood that they are not intended to limit the present invention.

EXAMPLES 1 TO 7 AND COMPARATIVE EXAMPLES 1 AND 2

Polymer (a) (maleic anhydride-grafted polypropylene having a maleic anhydride content of 6.5% by weight and a degree of crystallinity of 66.2%), Polymer (b) (propylene-ethylene random copolymer having an ethylene content of 5% by weight and a degree of crystallinity of 54.7%) and Polymer (c) (ethylene-propylene copolymer rubber having an ethylene content of 75% by weight and a degree of crystallinity of 10.7%) were mixed at a mixing ratio shown in Table 1 and melt-kneaded at 230° C. together with 0.1% by weight of 2,6-di-t-butyl-p-cresol and 0.1% by weight of tetrakis[methylene(3,5-di-t-butyl-4-hydroxy-hydrocinnamate)]methane as stabilizers, based on the total amount of the polymer components and the stabilizers used, to thereby prepare pellets.

In Examples 6 and 7, in the process of melt-kneading, the compound further uniformly contained 0.1 part by weight of 2,5-dimethyl-2,5-di-t-butyl peroxyhexane as organic peroxide, per 100 parts by weight of the total amount of the polymer components (a), (b), and (c) to thereby prepare pellets at 230° C.

A three-layered blown bottle having a capacity of 500 ml was produced using the resulting pellets as an intermediate adhesive layer, polypropylene (PP) having an MFR of 0.8 g/10 min. as an outer layer, and PC ("Iupilon E2001" produced by Mitsubishi Gas Chemical Industries, Ltd.), PES ("Dianite MA500" produced by Mitsubishi Rayon Company Limited), or saponified EVA ("Eval F101" produced by Kuraray Co., Ltd.) as an inner layer.

The initial adhesive strength of the resulting bottle at the part having a blow-up ratio of 2 is shown in Table 1.

The bottle was filled with salad oil and, after sealing, subjected to retort processing in an autoclave at a temperature of 120° C. and at a relative humidity of 100% for 30 minutes. The adhesive strength after the retort processing at the part having a blow-up ratio of 2 is shown in Table 1.

100 to 2,000 kg/cm$^2$ and a degree of crystallinity of not more than 33%, in which an unsaturated carboxylic acid or the derivative thereof is grafted to at least a part of a polymer consisting of a hydrocarbon, said unsaturated carboxylic acid or the derivative thereof being present in an amount of from 0.01 to 5% by weight based on the modified olefin polymer.

2. A multi-layer laminated structure as in claim 1, wherein said polymer consisting of a hydrocarbon is a homopolymer of an α-olefin, a copolymer of two or more α-olefins or a mixture thereof.

3. A multi-layer laminated structure as in claim 1, wherein said unsaturated carboxylic acid or the derivative thereof is maleic anhydride.

4. A multi-layer laminated structure as in claim 1, wherein said modified olefin polymer has a degree of crystallinity of not more than 25%.

5. A multi-layer laminated structure as in claim 1, wherein said modified olefin polymer is partly cross-linked.

6. A multi-layer laminated structure as in claim 5, wherein the degree of crosslinking is such that the residue after extraction with cyclohexane at room temperature for 48 hours is from 40 to 80% by weight.

7. A multi-layer laminated structure as in claim 1, wherein said modified olefin polymer is a blend of said grafted polymer and at least one of high temperature-melting and high-crystalline olefin resinous polymer and low-crystalline and low-stiffness modulus olefin rubber.

TABLE 1

| | Comp. Ex. 1 | Comp. Ex. 2 | Ex. 1 | Ex. 2 | Ex. 3 | Ex. 4 | Ex. 5 | Ex. 6 | Ex. 7 |
|---|---|---|---|---|---|---|---|---|---|
| Composition (part by weight): | | | | | | | | | |
| Polymer (a) | 10 | 10 | 10 | 10 | 10 | 3 | 15 | 10 | |
| Polymer (b) | 60 | 50 | 30 | 10 | — | 37 | 25 | 10 | 37 |
| Polymer (c) | 30 | 40 | 60 | 80 | 90 | 60 | 60 | 80 | 60 |
| Maleic Anhydride Content (% by weight) | 0.65 | 0.65 | 0.65 | 0.65 | 0.65 | 0.2 | 0.98 | 0.65 | 0.2 |
| Stiffness Modulus (Kg/cm$^2$) | 3500 | 2300 | 1000 | 250 | 100 | 1000 | 1000 | 300 | 1150 |
| Degree of Crystallinity (%) | 42.7 | 38 | 30 | 21 | 16 | 28.6 | 30 | 21 | 28.6 |
| Degree of Crosslinking (% by weight) | — | — | — | — | — | — | — | 50 | 70 |
| Initial Adhesive Strength (g/25 mm): | | | | | | | | | |
| To PC | 0 | 500 | 1000 | 2500 | 3000 | 1000 | 1500 | 2400 | 1000 |
| To PES | 50 | 1000 | 2800 | not peeled | not peeled | 1250 | 3500 | not peeled | 1250 |
| To Saponified EVA | not peeled | not peeled | not peeled | not peeled | not peeled | not peeled | not peeled | not peeled | not peeled |
| To PP | not peeled | — | not peeled | 3500 | 3000 | not peeled | not peeled | not peeled | not peeled |
| Adhesive Strength After Retort Processing (g/25 mm): | | | | | | | | | |
| To PC | — | 0 | 600 | 1000 | 800 | 400 | 1200 | 1500 | 700 |
| To PES | — | 700 | 2200 | 2000 | 1800 | 1000 | 3200 | 2500 | 1200 |
| To Saponified EVA | — | not peeled | not peeled | not peeled | not peeled | not peeled | not peeled | not peeled | not peeled |
| To PP | — | not peeled | not peeled | 3300 | 2800 | not peeled | not peeled | 3300 | not peeled |

While the invention has been described in detail and with reference to specific embodiments thereof, it will be apparent to one skilled in the art that various changes and modifications can be made therein without departing from the spirit and scope thereof.

What is claimed is:

1. A multi-layer laminated structure comprising a polycarbonate or thermoplastic polyester layer having adjacently adhered thereto a layer comprised of a modified olefin polymer having a stiffness modulus of from 8. A multi-layer laminated structure as in claim 1, wherein said modified olefin polymer is a diluted product of said grafted polymer with an unmodified olefin polymer.

9. A multi-layer laminated structure according to claim 8, wherein the olefin rubber has a degree of crystallinity of not more than 33% and the high-crystalline resinous polymer has a degree of crystallinity of more than 33%.

* * * * *